United States Patent [19]

Karbo

[11] 4,336,918
[45] Jun. 29, 1982

[54] DIAPHRAGM VALVE WITH MULTIPLE PIVOT AXIS VALVE ELEMENT

[75] Inventor: Richard S. Karbo, Newport Beach, Calif.

[73] Assignee: Hydro-Rain, Inc., Laguna Niguel, Calif.

[21] Appl. No.: 198,122

[22] Filed: Oct. 27, 1980

Related U.S. Application Data

[63] Continuation-in-part of Ser. No. 100,935, Dec. 6, 1979, Pat. No. 4,301,992.

[51] Int. Cl.³ .................. F16K 31/12; F16K 25/00
[52] U.S. Cl. ......................... 251/46; 251/30; 251/87; 251/367
[58] Field of Search ............... 251/30, 46, 367, 303, 251/84, 87

[56] References Cited

U.S. PATENT DOCUMENTS

| | | | |
|---|---|---|---|
| 2,496,638 | 2/1950 | Ray | 251/87 |
| 2,686,034 | 8/1954 | Rabal | 251/46 |
| 3,386,467 | 6/1968 | Katchka | 251/303 |
| 3,460,564 | 8/1969 | Taylor et al. | 251/30 |
| 3,476,353 | 4/1969 | Stampfli | 251/46 |
| 3,632,080 | 1/1972 | King | 251/30 |
| 4,105,186 | 8/1978 | Eby | 251/30 |
| 4,226,259 | 10/1980 | Szekely et al. | 251/30 |

Primary Examiner—A. Michael Chambers
Attorney, Agent, or Firm—Gordon L. Peterson

[57] ABSTRACT

A valve comprising a valve housing having a flow passage extending through the valve housing and a cavity communicating with the flow passage, a valve seat in the flow passage, a diaphragm extending across the cavity to define a control chamber on one side of the diaphragm and a valve element for controlling the flow of fluid through the flow passage. The valve element is mounted for pivotal movement about primary and secondary pivotal axes. The opening and closing of the valve element is controlled by the pressure in the control chamber.

18 Claims, 4 Drawing Figures

DIAPHRAGM VALVE WITH MULTIPLE PIVOT AXIS VALVE ELEMENT

BACKGROUND OF THE INVENTION

This application is a continuation-in-part of my co-pending application Ser. No. 100,935 filed December 6, 1979, and entitled diaphragm valve now U.S. Pat. No. 4,301,992.

Diaphragm operated valves are used to control the flow of various fluids, such as water, for many different purposes, including irrigation. The valve of my copending application includes a valve housing and a pivotally mounted valve element for cooperating with a valve seat to control the flow of fluid through the valve housing. The valve element is held closed by inlet water pressure which is supplied to a control chamber on one side of the valve element. To open the valve, the pressure in the control chamber is vented by a solenoid valve, or other suitable means, and this allows inlet water pressure to open the valve.

It is common practice for a valve element in this type of valve to include a resilient pad of rubber or similar material for engaging the valve seat to provide a fluid-tight seal when the valve is in the closed position. Unfortunately, these pads are not manufactured to close tolerances, and this can result in the pad not making sealing contact with the valve seat over a full 360 degrees in which event the valve leaks. The pivot axis for the valve element is located so that the pad properly seats against the valve seat provided the pad is of the correct thickness. Because of the wide variation in thickness tolerances of the pads, the pad may be too thick or too thin to properly seat on the valve seat. Also, the thickness of the pad may not be uniform in which event the relatively thick portion of the pad may "hang up" on a region of the valve seat.

To open the valve, the control chamber is vented by a remotely operable valve, such as a solenoid valve, or by a manually operable valve. The manually operable valve vents the control chamber to the atmosphere, i.e., to the exterior of the valves. Venting of the control chamber to the atmosphere creates a problem when the valve is used with a toxic or corrosive fluid.

SUMMARY OF THE INVENTION

This invention provides a valve which accommodates pivotal valve elements and portions thereof which are not constructed to close tolerances. Specifically, with this invention, the wide variation in thickness of the pad on the valve element is prevented from causing the valve to leak.

This is accomplished by pivotally mounting the valve element for pivotal movement about a primary pivot axis and a secondary pivot axis. Movement of the valve element about the primary pivot axis moves the valve element between a closed position in which the valve element engages the valve seat to essentially block the flow of fluid through the flow passage of the valve and an open position in which the valve element is spaced from the valve seat to allow the flow of fluid through the flow passage. The secondary pivot axis provides for automatic adjustment in the position of the valve element to permit the valve element to more tightly seat against the valve seat. Thus, if the valve element "hangs up" on a segment of the valve seat after pivoting to the closed position about the primary pivot axis, the valve element can pivot about the secondary pivot axis so as to bring the valve element into sealing contact with the valve seat over the full 360-degree circumference of the valve seat. This provides assurance that the valve will not leak.

The primary and secondary pivot axes can be oriented in any way that will permit them to carry out the functions noted above. However, preferably the pivot axes are generally parallel to each other. In addition, the secondary pivot axis is preferably generally parallel to the plane defined by the valve seat. Also, the secondary pivot axis preferably lies relatively close to the center of the opening defined by the valve seat.

The valve element can advantageously be mounted about both pivot axes by a pivot arm which is pivotally attached directly or indirectly to the valve housing and to the valve element.

The valve element can advantageously be of a unitary construction, and preferably a spring is used to bias the valve element toward the closed position. In one form of the invention, a relatively rigid plate is provided in the control chamber, and an adjustable stop is carried by the valve housing and is engageable with the plate to define the open position of the valve element.

This invention also provides for manual venting of the control chamber to a location in the flow passage of the valve downstream of the valve element. Accordingly, if the valve is handling corrosive, toxic or otherwise objectionable fluids, these fluids remain contained within the fluid-carrying system and are not ejected into the atmosphere.

The control chamber can be vented by either a remotely operable valve or by a manually operable valve. With this invention, these two valves are in parallel so that either of them can vent the control chamber to a location in the flow passage downstream of the valve element. This can be advantageously accomplished by providing a vent chamber communicating with the control chamber and an open-ended tube in the vent chamber. The remotely operable valve includes means cooperating with the tube to control the flow of fluid through the tube. The manually operable valve includes means for moving the tube for establishing a vent path from the control chamber to a location in the flow passage downstream of the valve element.

Movement of the tube can establish the vent path in various ways. However, preferably movement of the tube unseats one end of the tube from a surface so as to permit fluid flow from the vent chamber through a vent passage to the flow passage of the valve. Movement of the tube can also be accomplished in different ways, although preferably it is accomplished by at least partially unthreading a fitting, of which the tube forms a part, from a socket in the housing. The fitting also can advantageously carry the remotely operable valve.

The invention, together with further features and advantages thereof, may best be understood by reference to the following description taken in connection with the accompanying drawing.

DESCRIPTION OF THE PREFERRED EMBODIMENT

Figure 1:
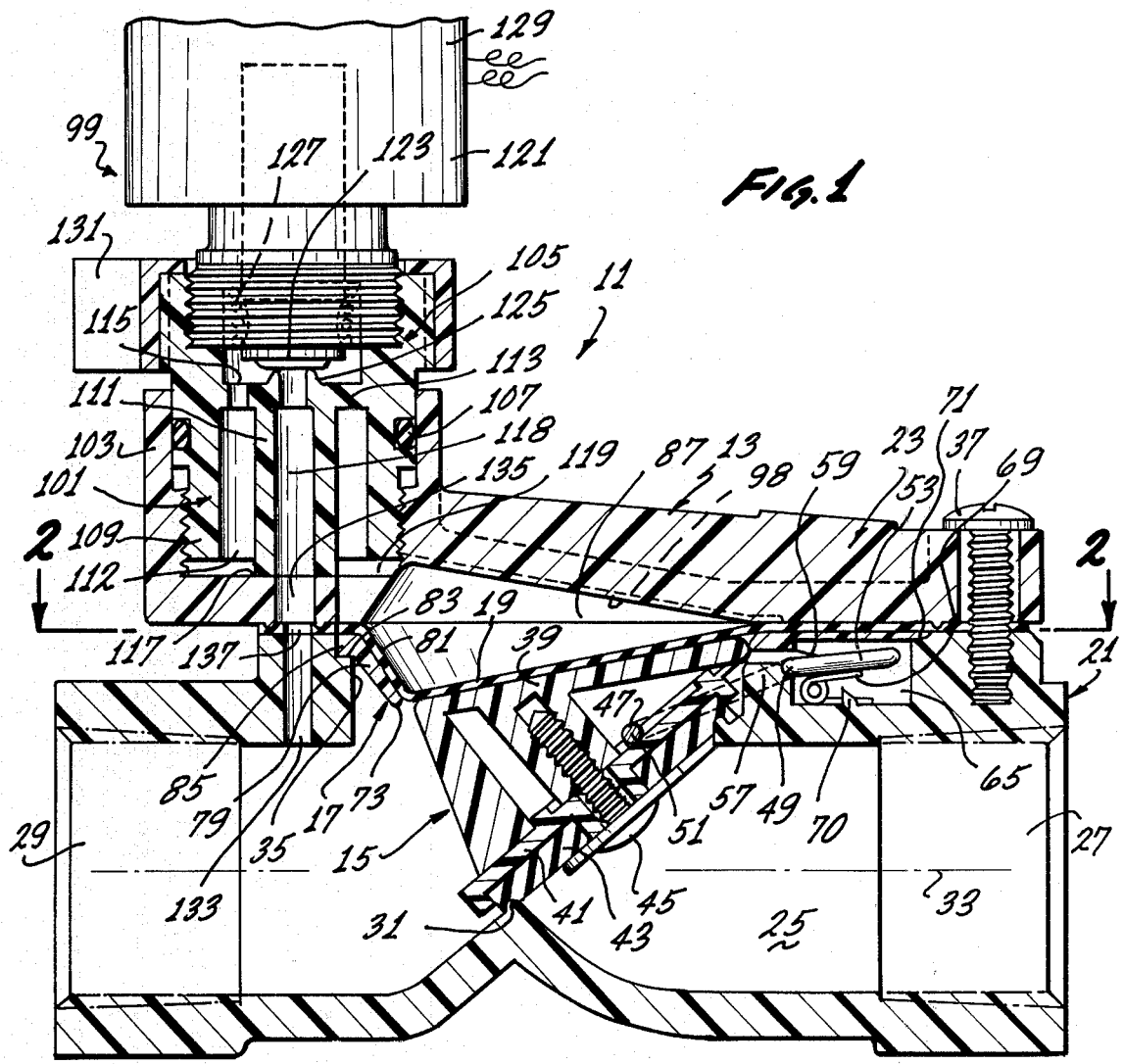
FIG. 1 is a longitudinal sectional view taken through a valve constructed in accordance with the teachings of this invention, with the valve element being in the closed position.
Figure 3:
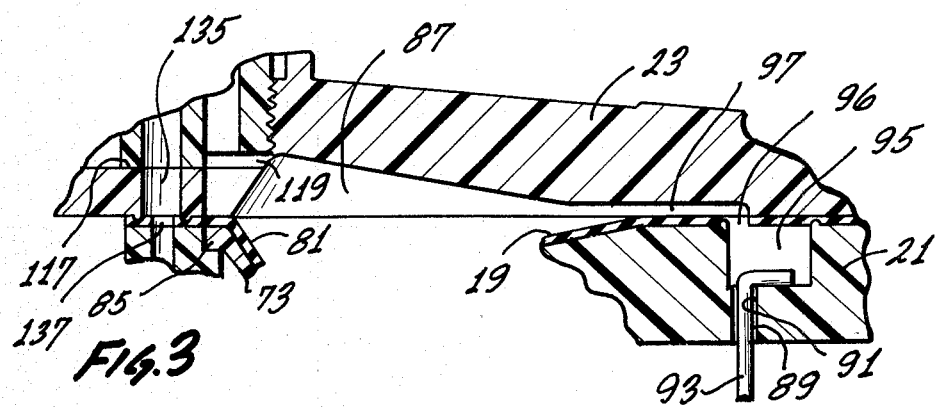
FIG. 3 is an enlarged fragmentary sectional view taken generally along line 3—3 of FIG. 2.
Figure 2:
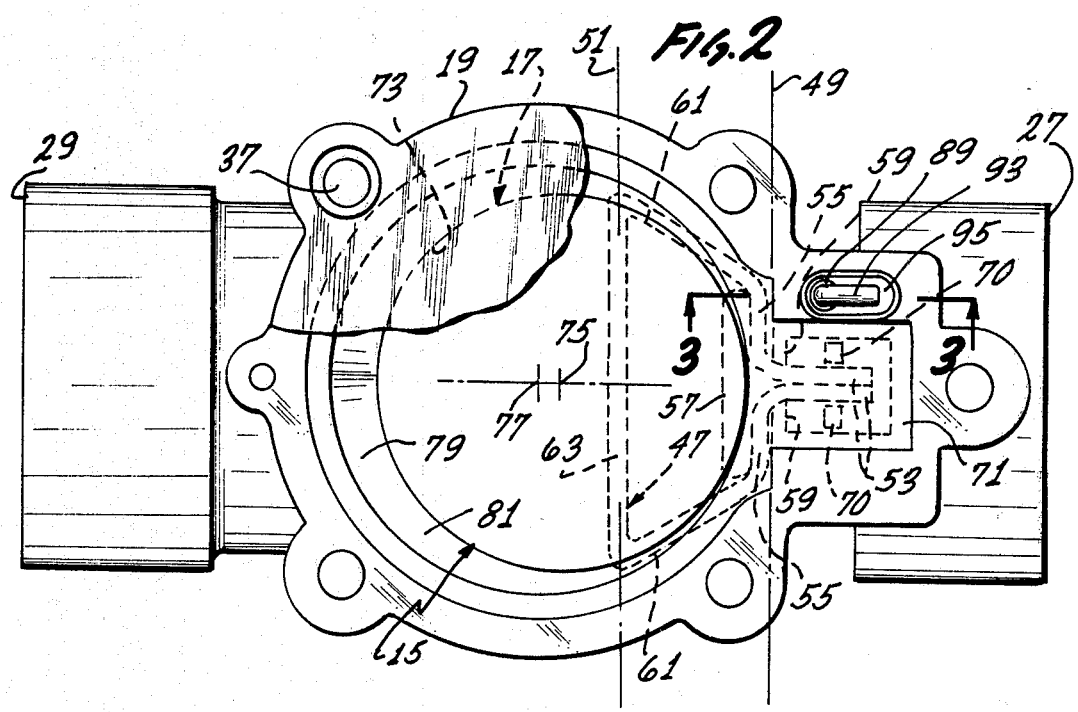
FIG. 2 is a sectional view taken generally along line 2—2 of FIG. 1 with a portion of the diaphragm broken away and with certain hidden portions being shown in dashed lines.

FIGS. 1-3 show a diaphragm valve 11 which generally includes a valve housing 13, a valve element 15, a diaphragm support 17 and a diaphragm 19. Although various different materials can be used, in the embodiment illustrated, the valve housing 13 is molded from a suitable plastic material.

The valve housing 13 includes a valve body 21 and a cover 23. The valve body 21 has a straight, essentially cylindrical flow passage 25 extending completely through it from an inlet 27 to an outlet 29. The valve body 21 has an annular valve seat 31 of circular configuration in the flow passage 25. The flow passage 25 has a central or longitudinal axis 33, and the valve seat 31 lies in a plane which forms an acute angle relative to the axis 33. Although the magnitude of this acute angle can vary, in the embodiment illustrated, the angle is approximately 40 degrees.

The valve body 21 has an opening 35 at the upper end of the valve body as viewed in FIG. 1. The opening 35 is sized so that the internal components of the valve can be passed through it for ease of assembly. The opening 35 is closed by the cover 23 which is releasably attached to the valve body in any suitable manner, such as by screws 37.

In the embodiment illustrated, the valve element 15 is of unitary construction in the sense that its parts do not move relative to each other during normal operation of the valve 11. Although the valve element 15 can be of various different constructions, in the embodiment illustrated, it includes a valve element body 39, a retainer 41, a resilient rubber pad 43 carried by the retainer 41, and a screw 45 for holding the parts of the valve element together. As shown in FIG. 1, the pad 43 engages the valve seat 31 in the closed position of the valve.

The valve element 15 is sized to be received through the opening 35 into the valve body 21. The valve element 15 is mounted on the valve body 21 by a pivot arm 47 (FIGS. 1 and 2) for pivotal movement about a primary pivot axis 49 and a secondary pivot axis 51. Pivotal movement of the valve element 15 about the primary pivot axis 49 moves the valve element between a closed position in which the valve element engages the valve seat 31 to essentially block the flow of fluid through the flow passage 25 from the inlet 27 to the outlet 29 and an open position in which the valve element is spaced from the valve seat to allow the flow of fluid through the flow passage from the inlet to the outlet. Pivotal movement of the valve element 15 about the secondary pivot axis 51 assures that the pad 43 will sealingly engage the valve seat 31 for 360 degrees in the closed position of the valve element. The pivot axes 49 and 51 are parallel to each other and parallel to the plane defined by the valve seat 31. In addition, the pivot axis 51 is spaced from, but adjacent to, the center of the opening defined by the valve seat 31.

The valve element 15 can be mounted for pivotal movement about the primary and secondary pivot axes in different ways, and the use of the pivot arm 47, while preferred, should be taken as illustrative. The pivot arm 47 can advantageously be in the form of a wire formed into a loop and having two adjacent free-end portions or lever portions 53 as shown in FIG. 2. The pivot arm 47 has oppositely extending sections 55 which are held between projections 57 and 59 on the valve body 21 so as to mount the sections 55 for pivotal movement about the pivot axis 49.

The pivot arm 47 has diverging sections 61 and a connecting section 63. The connecting section 63 extends through the valve element 15, and in particular, through the opposite side walls of the valve element to pivotally attach the valve element to the connecting section, with the pivot axis 51 being co-axial with the connecting section 63. As shown in FIGS. 1 and 2, the end portions 53 are positioned in a well 65 of the valve body 21.

A spring 60 (FIG. 1) is provided in the well 65 and acts between the end portions 53 and the bottom of the well to bias the pivot arm 47 clockwise as shown in FIG. 1 to thereby bias the valve element 15 toward the closed position. The spring 69 is held in the well 65 between projections 70.

The diaphragm support 17 in the embodiment illustrated is in the form of an integral ring which has been molded from a suitable plastic material and which has a tab 71 (FIGS. 1 and 2) for covering the well 65. The diaphragm support 17 has an opening 73 sized to accommodate the valve element 15. The opening 73 has a center 75 (FIG. 2), and the outer periphery of the diaphragm support 17 is asymmetrical. The diaphragm support 17 includes a diaphragm supporting lip 79 of minimum depth and length adjacent the tab 71 and of maximum depth and length opposite the tab 71, with the depth of the lip progressively increasing from the tab 71. The lip 79 has a smooth inner surface 81 of generally conical configuration. For example, the diaphragm support 17 can be in the form of a cone which is located at an angle.

To facilitate assembly, the valve body 21 has an annular mounting shoulder 83 facing upwardly at the mouth of the opening 35. The diaphragm support 17 has a flange 85 adapted to rest on the mounting shoulder 83. Thus, during assembly, the diaphragm support 17 can be inserted into the opening and placed on the mounting shoulder 83.

The diaphragm 19 is preferably molded into the configuration shown in FIG. 1. With this slack molded into the diaphragm 19, the diaphragm can move with the valve element 15 between the open and closed positions without stretching or resiliently deforming. This minimizes the force required to move the valve element 15.

The diaphragm 19, which may be constructed of rubber or a suitable plastic, is sandwiched between the valve body 21 and the cover 23 to form a seal between these two members. The diaphragm 19 extends across the cavity in the valve housing 13 above the passage 25 to define a control chamber 87 on one side of the diaphragm, with the other side of the diaphragm communicating with the flow passage 25. As shown in FIG. 1, the central region of the diaphragm 19 engages the valve element 15.

By pressurizing the control chamber 87, the diaphragm 19 urges the valve element 15 toward the closed position. Similarly, by reducing the pressure in the control chamber 87, the force of the fluid from the inlet 27 acting on the valve element 15 is sufficient to pivot the valve element to the open position. Although the pressure in the control chamber 87 can be controlled in different ways, in the embodiment illustrated, the control chamber is provided with liquid from the inlet 27 through an orifice 89 (FIG. 3) which is defined by a hole 91 in the valve body and a control rod 93 loosely received within the hole. As shown in FIG. 3, the orifice 89 communicates with the control chamber 87 through a cavity 95 in the valve body 21, a hole 96 in the diaphragm and a groove 97 in the cover 23. Accordingly, the flow passage 25 upstream of the valve element 15 is in continuous communication with the control chamber 87. To prevent the diaphragm 19 from blocking this communication, the cover 23 may have one or more internal grooves 98 (FIG. 1) in the control chamber 87.

To permit the valve element 15 to move to the open position, the pressure in the control chamber 87 must be reduced. This can be accomplished by remotely operable valve means 99 or by manually operable valve means 101 (FIG. 1). More specifically, the cover 23 includes an internally threaded socket 103, and a fitting 105 of molded plastic material is threadedly received within the socket with an O-ring 107 sealing the interface between these two members. The fitting 105 includes an annular skirt 109 threaded into the socket 103, an open-ended tube or tubular section 111 coaxial with the skirt and spaced radially inwardly from the skirt to define an annular passage section 112, a web 113 for joining the skirt to the tube and an aperture 115 in the web. The tube 111 has an axial tube passage section 118 and the tube projects axially beyond the skirt 109 into contact with a bottom surface 117 of the socket. The lower face of the skirt 109 is spaced upwardly from the surface 117. A vent passage section 119 provides communication between the control chamber 87 and the annular passage section 112 interior of the fitting 105.

The upper end of the skirt 109 forms a threaded socket into which a conventional solenoid-operated valve 121 is threaded. The solenoid-operated valve includes a vent valve element 123 normally resiliently held in contact with a vent valve seat 125 formed integrally with the upper end of the tube 111 by a spring 127. The solenoid-operated valve 121 includes a solenoid 129 which can be energized to retract the vent valve element 123 upwardly off of the vent valve seat 125. An annular manual actuator 131 is attached to the upper end of the fitting 105 to facilitate threading the fitting into and out of the socket 103. The valve body 21 has a vent passage section 133 which communicates with the tube passage section 118 via a port 135 in the bottom wall of the socket 103 and an aperture 137 in the diaphragm 19.

During operation, fluid, such as water, from the control chamber 87 passes from the control chamber through the vent passage section 119, the annular passage section 112 and the aperture 115 to the vent valve element 123. To open the vent valve element 115, the solenoid 129 is energized to lift the vent valve element 123 off of the vent valve seat 125 whereupon water from the control chamber 87 is vented to a location in the flow passage 25 downstream of the valve element 15 via the tube passage section 118, the port 135, the aperture 137 and the vent passage section 133. This allows the water or other fluid under pressure in the flow passage 25 upstream of the valve element 15 to pivot the valve element 15 about the pivot axis 49 to the open position.

To close the valve 11, the solenoid 129 is deenergized, whereupon the spring 127 returns the vent valve element 123 into sealing engagement with the vent valve seat 125 so that pressure can be restored in the control chamber 87 via the orifice 89. Because the area of the valve element 15 exposed to the pressure in the control chamber is larger than the area of the valve exposed to inlet pressure in the flow passage 25, the pressure in the control chamber 87, particularly when coupled with the force of the spring 69, is sufficient to pivot the valve element 15 to the closed position. Once in the closed position, the valve element 15 can also pivot about the pivot axis 51 to cause the valve element to firmly seat on the valve seat 31 along the full length of the valve seat.

To manually bring about opening of the valve element, the manual actuator 131 is rotated to partially unscrew the fitting 105 from the socket 103. This separates the lower end of the tube 111 from the surface 117 so that fluid from the control chamber 87 is vented to the outlet 29 via the separation then existing between the tube and the surface 117, the port 135, the aperture 137 and the vent passage section 113. To close the valve element 15, the fitting 105 is manually turned to advance the fitting into the socket 103 to the position shown in FIG. 1 in which the lower end of the tube 111 sealingly engages the surface 117. Thus, the lower end of the tube 111 constitutes a valve element, and the surface 117 constitutes a valve seat of a manually operable valve. The control chamber 87 is vented to the flow passage adjacent the outlet 29 regardless of which of the valve means 99 and 101 is used.

Figure 4:
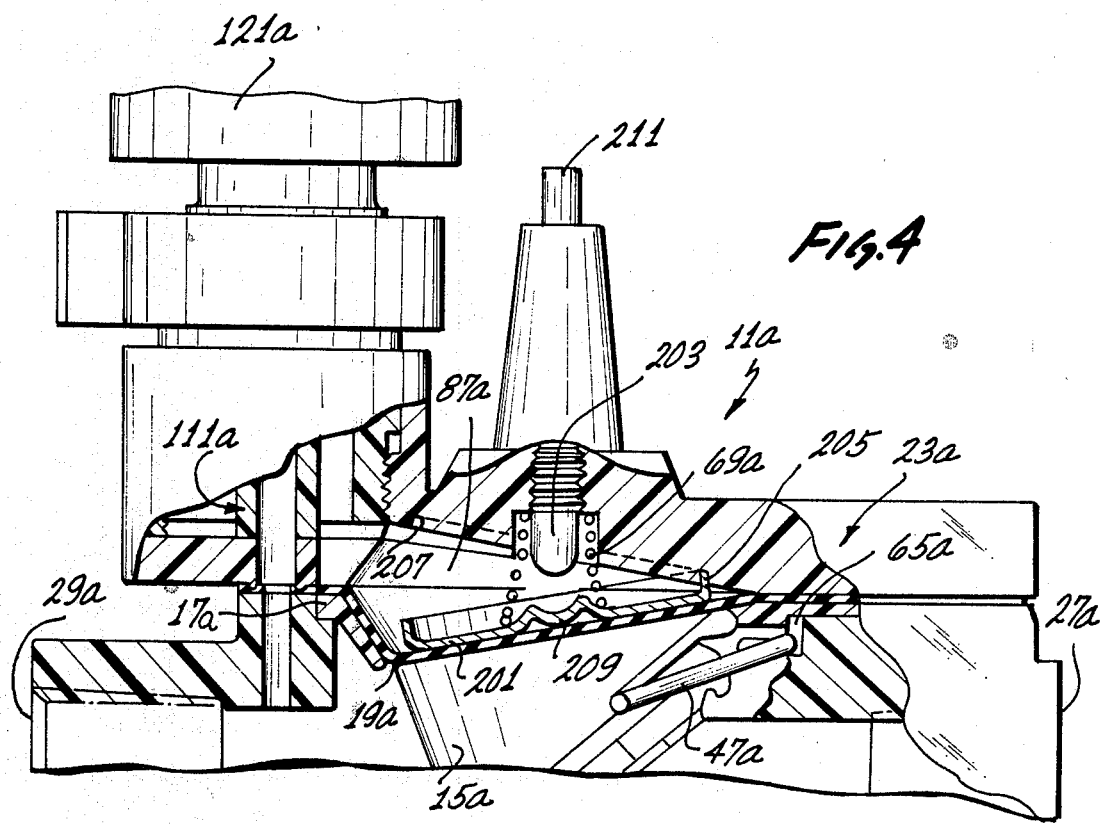
FIG. 4 is an elevational view partially in section of a modified valve constructed in accordance with the teachings of this invention.

FIG. 4 shows a valve 11a which is identical to the valve 11 in all respects not shown or described herein. Portions of the valve 11a corresponding to portions of the valve 11 are designated by corresponding reference numerals followed by the letter "a."

The primary difference between the valves 11 and 11a is that the latter includes a rigid plate 201 above the diaphragm 19a in the control chamber 87a and an adjustable stop 203 threaded into the cover 23a. The spring 69 of the valve 11 is replaced by a coil compression spring 69a acting between the cover 23a and the plate 201.

The plate 201 has a peripheral flange 205 which is receivable in an annular groove 207 of the cover 23a when the valve element 15a is in the open position. The plate 203 also has an upwardly opening cavity 209 for receiving the lower end of the adjustable stop 203 in the openmost position of the valve element 15a.

The stop 203 has an exposed portion 211 which can be rotated to advance it further into, or retract it from, the control chamber 87a to thereby control the maximum opening of the valve element 15a. The plate 201 protects the diaphragm from the damage that would occur if the diaphragm engaged the stop 203.

Because the spring 69a is removed from the well 65a, the well 65a can be much smaller than the well 65, and the end portions 53 of the pivot arm 47 can be omitted.

Although exemplary embodiments of the invention have been shown and described, many changes, modifications and substitutions may be made by one having ordinary skill in the art without necessarily departing from the spirit and scope of this invention.

I claim:
1. A valve comprising:
   a valve housing having a passage extending therethrough, said passage having an inlet and an outlet and a longitudinal axis, said housing having a valve seat in said passage, said valve seat defining a plane which forms an acute angle with said axis, and said valve housing having a cavity communicating with said passage;

a movable diaphragm extending across said cavity to define a control chamber on one side of the diaphragm, the other side of the diaphragm communicating with the passage;

control means for varying the pressure in the control chamber to tend to control the position of the diaphragm, said control means including passage means in said valve housing leading to said control chamber;

a diaphragm support having an opening therein;

means for mounting said diaphragm support so that the diaphragm support can at least partially support the diaphragm on said other side of the diaphragm in a predetermined position of the diaphragm;

a valve element;

means for pivotally mounting the valve element on the valve housing for pivotal movement about a primary pivot axis relative to said diaphragm support between a closed position in which the valve element engages the valve seat to essentially block the flow of fluid through the passage from the inlet to the outlet and an open position in which the valve element is spaced from the valve seat to allow the flow of fluid through the passage from the inlet to the outlet;

means for mounting the valve element for pivotal movement about a secondary pivot axis with movement of the valve element about the secondary pivot axis adjusting the position of the valve element to permit the valve element to more tightly seat against the valve seat; and said diaphragm acting through said opening in said diaphragm support to urge the valve element toward the closed position when the pressure in the control chamber is sufficient and said valve element being movable to said open position by fluid from the inlet acting on said valve element when the pressure in the control chamber is reduced by said control means.

2. A valve comprising:

a valve housing having a flow passage extending therethrough, said flow passage having an inlet and an outlet, said valve housing having a cavity communicating with said flow passage;

a valve seat in said flow passage;

a diaphragm extending across said cavity to define a control chamber on one side of the diaphragm, the other side of the diaphragm communicating with the flow passage;

passage means communicating with said control chamber whereby the pressure in the control chamber can be varied to tend to control the position of the diaphragm;

a diaphragm support having an opening therein;

means for mounting said diaphragm support in said cavity and out of the control chamber so that the diaphragm support can at least partially support the diaphragm in a predetermined position of the diaphragm;

a valve element;

means for pivotally mounting the valve element for pivotal movement about a primary pivot axis and a secondary pivot axis with movement of the valve element about the primary pivot axis being between a closed position in which the valve element engages the valve seat to essentially block the flow of fluid through the flow passage from the inlet to the outlet and an open position in which the valve element is spaced from the valve seat to allow the flow of fluid through the flow passage from the inlet to the outlet, said secondary pivot axis being positioned so that movement of the valve element about the secondary pivot axis adjusts the position of the valve element to permit the valve element to more tightly seat against the valve seat;

the valve element being urged toward the open position by fluid in the flow passage on the upstream side of the valve element and the pressure in the control chamber acting through said diaphragm to urge the valve element toward the closed position whereby the pressure in the control chamber controls the position of the valve element; and said pivotal mounting means including a wirelike pivot arm formed into a loop and having oppositely extending sections and a first section spaced from said oppositely extending section and means on said valve housing for receiving said oppositely extending sections to define said primary pivot axis and means on said valve element for receiving said first section to define said secondary pivot axis.

3. A valve as defined in claim 2 wherein said primary and secondary pivot axes are generally parallel to each other.

4. A valve as defined in claim 2 wherein the valve seat lies generally in a plane and the secondary pivot axis is generally parallel to said plane.

5. A valve as defined in claim 2 wherein the valve seat lies generally in a plane and the secondary pivot axis is generally parallel to said plane and to said primary pivot axis.

6. A valve as defined in claim 2 wherein said diaphragm support includes an asymmetrical ring-like member.

7. A valve as defined in claim 2 wherein said pivot arm includes diverging sections joining said first section to said oppositely extending sections.

8. A valve as defined in claim 2 wherein said means on said valve housing includes projections on opposite sides of the oppositely extending sections to mount them for pivotal movement about the primary pivot axis.

9. A valve as defined in claim 2 wherein said pivot arm has a lever portion extending from said oppositely extending portions and said valve includes biasing means acting on said lever portion to tend to urge the valve element toward the closed position.

10. A valve comprising:

a valve housing having a flow passage extending therethrough, said flow passage having an inlet and an outlet, said valve housing having a cavity communicating with said flow passage;

a valve seat in said flow passage;

a diaphragm extending across said cavity to define a control chamber on one side of the diaphragm, the other side of the diaphragm communicating with the flow passage;

passage means communicating with said control chamber whereby the pressure in the control chamber can be varied to tend to control the position of the diaphragm;

a diaphragm support having an opening therein;
means for mounting said diaphragm support in said cavity and out of the control chamber so that the diaphragm support can at least partially support the diaphragm in a predetermined position of the diaphragm;
a valve element;
means for pivotally mounting the valve element for pivotal movement about a primary pivot axis and a secondary pivot axis with movement of the valve element about the primary pivot axis being between a closed position in which the valve element engages the valve seat to essentially block the flow of fluid through the flow passage from the inlet to the outlet and an open position in which the valve element is spaced from the valve seat to allow the flow of fluid through the flow passage from the inlet to the outlet, said secondary pivot axis being positioned so that movement of the valve element about the secondary pivot axis adjusts the position of the valve element to permit the valve element to more tightly seat against the valve seat;
the valve element being urged toward the open position by fluid in the flow passage on the upstream side of the valve element and the pressure in the control chamber acting through said diaphragm to urge the valve element toward the closed position whereby the pressure in the control chamber controls the position of the valve element; and
said diaphragm support including an asymetrical ring-like member with a generally conical surface for supporting said other side of said diaphragm, said conical surface being truncated at an angle.

11. A valve as defined in claim 10 wherein said passage means includes an inlet passage leading from a location in the flow passage on the upstream side of said valve element to said control chamber and a vent passage leading from the control chamber to a location in the flow passage on the downstream side of said valve element, and said valve includes manually operable valve means for opening and closing said vent passage.

12. A valve as defined in claim 11 wherein said valve includes remotely operable valve means in parallel with said manually operable valve means for opening and closing said vent passage whereby either of said valve means can vent the control chamber through said vent passage.

13. A valve as defined in claim 12 wherein said vent passage includes means defining a vent chamber and an open-ended tube in said vent chamber, said remotely operable valve means including means cooperating with said tube to control the flow of fluid through the tube and said manually operable valve means including means for moving said tube for establishing a vent path from said control chamber to said location downstream of said valve element.

14. A valve as defined in claim 12 wherein said valve housing includes a socket, said valve including a fitting threadedly received in said socket, said remotely operable valve means being carried by said fitting, and said manually operable valve means being responsive to at least partially unscrewing of the fitting from the socket to open to vent the control chamber.

15. A valve as defined in claim 7 wherein said valve housing includes a valve body having said flow passage therein, said vent passage includes a vent passage section in said valve body, said valve housing including a cover attached to said valve housing with said diaphragm being sandwiched between said cover and said valve housing, said vent passage including a vent passage section in said cover communicating with the vent passage section of said valve body through an opening in said diaphragm.

16. A valve as defined in claim 10 wherein the flow passage through the valve housing has a longitudinal axis and the valve seat defines a plane which forms an acute angle with said axis, said valve element includes a resilient, deformable member engageable with the valve seat in the closed position to essentially block the flow of fluid through the passage from the inlet to the outlet.

17. A valve as defined in claim 10 including a relatively rigid plate in said control chamber, biasing means for urging said plate toward said diaphragm in a direction to urge said valve element toward said closed position, and an adjustable stop carried by said valve housing and engageable with said plate to define said open position.

18. A valve comprising:
a valve housing having a flow passage extending therethrough, said flow passage having an inlet and an outlet, said valve housing having a cavity communicating with said flow passage;
a valve seat in said flow passage;
a diaphragm extending across said cavity to define a control chamber on one side of the diaphragm, the other side of the diaphragm communicating with the flow passage;
means for providing communication between a location in the flow passage upstream of said valve element and said control chamber whereby the control chamber can be supplied with fluid under pressure from said flow passage;
a valve element;
means for mounting the valve element for movement between a closed position in which the valve element engages the valve seat to essentially block the flow of fluid through the flow passage from the inlet to the outlet and an open position in which the valve element is spaced from the valve seat to allow the flow of fluid through the flow passage from the inlet to the outlet;
the valve element being urged toward the open position by fluid in the flow passage on the upstream side of the valve element and the pressure in the control chamber acting through said diaphragm to urge the valve element toward the closed position whereby the pressure in the control chamber controls the position of the valve element;
vent passage means leading from said control chamber to a location in said flow passage downstream of said valve element;
remotely operable valve means in said vent passage means for controlling the flow of fluid from the control chamber through the vent passage means;
manually operable valve means in said vent passage means and in parallel with said remotely operable valve means for controlling the flow of fluid from the control chamber through the vent passage means whereby the control chamber can be vented to allow movement of the valve element to the open position by either of said valve means; and
said valve housing includes a socket, said valve including a fitting threadedly received in said socket, said fitting including a tubular section having a vent valve seat at one end and an opposite end, said vent passage means including a passage section leading from said control chamber to said vent valve seat, and a passage section in said valve housing communicating the interior of said tubular section with said location in the flow passage downstream of said valve element, said remotely operable valve means includes said vent valve seat and a remotely operable valve element cooperating with said vent seat and said manually operable valve means includes said opposite end of said tubular section and a surface of said socket normally engaged by said opposite end of the tubular section whereby the manually operable valve means can be opened by at least partially unscrewing the fitting from the socket to separate said opposte end of the tubular section from said surface.

* * * * *